US009690756B2

(12) United States Patent
Zhou et al.

(10) Patent No.: US 9,690,756 B2
(45) Date of Patent: Jun. 27, 2017

(54) METHOD AND DEVICE FOR RAPIDLY EDITING SENDING CONTENT BASED ON A RECEIVER

(71) Applicant: BORQS WIRELESS LTD., Beijing (CN)

(72) Inventors: Xiaofei Zhou, Beijing (CN); Wei Zou, Beijing (CN); Jianbing Li, Beijing (CN)

(73) Assignee: BORQS WIRELESS LTD., Beijing (CN)

( * ) Notice: Subject to any disclaimer, the term of this patent is extended or adjusted under 35 U.S.C. 154(b) by 402 days.

(21) Appl. No.: 14/385,191

(22) PCT Filed: Nov. 2, 2012

(86) PCT No.: PCT/CN2012/083951
§ 371 (c)(1),
(2) Date: Sep. 15, 2014

(87) PCT Pub. No.: WO2013/135058
PCT Pub. Date: Sep. 19, 2013

(65) Prior Publication Data
US 2015/0052083 A1 Feb. 19, 2015

(30) Foreign Application Priority Data
Mar. 15, 2012 (CN) .......................... 2012 1 0068296

(51) Int. Cl.
G06F 17/00 (2006.01)
G06F 17/20 (2006.01)
(Continued)

(52) U.S. Cl.
CPC ............. G06F 17/22 (2013.01); G06F 17/24 (2013.01); G06F 17/2715 (2013.01);
(Continued)

(58) Field of Classification Search
USPC .......................................... 706/11
See application file for complete search history.

(56) References Cited

U.S. PATENT DOCUMENTS 6,253,254 B1 * 6/2001 Erlenkoetter ..... G06F 17/30893
707/999.01
8,539,349 B1 * 9/2013 Kirshenbaum ....... G06F 17/277
704/10
(Continued)

FOREIGN PATENT DOCUMENTS

CN 101432713 A 5/2009
CN 102637160 A 8/2012

OTHER PUBLICATIONS

Statistics of parts of speech frequencies in Marko Cheremshyna's works Ihor Kulchytskyy 2015 Xth International Scientific and Technical Conference "Computer Sciences and Information Technologies" (CSIT) Year: 2015 pp. 209-211, DOI: 10.1109/STC-CSIT.2015.7325467 IEEE Conference Publications.*

(Continued)

Primary Examiner — Michael B Holmes
(74) Attorney, Agent, or Firm — Christensen, Fonder, Dardi & Herbert, PLLC

(57) ABSTRACT

A method and a device for rapidly editing sending content based on a receiver. A sending-content-learning module is used to learn sending content to generate a content fragment for a receiver, and perform word frequency statistics on the content fragment; a corresponding list is generated from receiver information, the content fragment, and the word frequency statistics, and is stored; for the receiver and the word frequency statistics, the content fragment is displayed for a sender to edit the sending content, so as to send the sending content to a corresponding receiver. When a user edits a short message or an email, a content fragment commonly used for a corresponding receiver is displayed in a display box, and a sender can rapidly complete editing by selecting a required content fragment, thereby facilitating fast and convenient input and improving the user experience.

5 Claims, 2 Drawing Sheets

(51) Int. Cl.
  G06F 17/22    (2006.01)
  G06F 17/24    (2006.01)
  G06F 17/27    (2006.01)
  G06N 99/00    (2010.01)
  H04M 1/725    (2006.01)
  H04W 4/12     (2009.01)

(52) U.S. Cl.
  CPC ...... *G06N 99/005* (2013.01); *H04M 1/72552* (2013.01); *H04W 4/12* (2013.01)

(56) References Cited

U.S. PATENT DOCUMENTS

| | | | |
|---|---|---|---|
| 2004/0215726 A1 | 10/2004 | Arning et al. | |
| 2006/0075019 A1 | 4/2006 | Donovan et al. | |
| 2008/0313283 A1* | 12/2008 | Cohen | G06Q 10/107 709/206 |
| 2015/0235126 A1* | 8/2015 | de Borst | H04L 47/10 706/47 |

OTHER PUBLICATIONS

System for monitoring natural disasters using natural language processing in the social network Twitter Miguel Maldonado; Darwin Alulema; Derlin Morocho; Marida Proaño 2016 IEEE International Carnahan Conference on Security Technology (ICCST) Year: 2016 pp. 1-6, DOI: 10.1109/CCST.2016.7815686 IEEE Conference Publications.*

Multimodal Stereoscopic Movie Summarization Conforming to Narrative Characteristics Ioannis Mademlis; Anastasios Tefas; Nikos Nikolaidis; Ioannis Pitas IEEE Transactions on Image Processing Year: 2016, vol. 25, Issue: 12 pp. 5828-5840, DOI: 10.1109/TIP.2016.2615289 IEEE Journals & Magazines.*

SQL-to-NoSQL Schema Denormalization and Migration: A Study on Content Management Systems Chao-Hsien Lee; Yu-Lin Zheng 2015 IEEE International Conference on Systems, Man, and Cybernetics Year: 2015 pp. 2022-2026, DOI: 10.1109/SMC.2015.353 IEEE Conference Publications.*

* cited by examiner

METHOD AND DEVICE FOR RAPIDLY EDITING SENDING CONTENT BASED ON A RECEIVER

PRIORITY CLAIM

The present application is a National Phase entry of PCT Application No. PCT/CN2012/083951, filed Nov. 2, 2012, which claims priority to Chinese Patent Application No. 201210068296.1, filed Mar. 15, 2012, the disclosures of which are hereby incorporated by reference herein in their entirety.

TECHNICAL FIELD

The present invention relates to a method for editing the content of a short message or an email, and in particular to a method and a device for rapidly editing the content to be sent based on the recipient.

BACKGROUND ART

In the prior art, when a user uses a mobile terminal to send a short message or an email to a recipient, he/she usually utilizes an existing input method to edit the content of the short message or email. Since the input method itself has an intelligent learning function and can learn the user's input habit and frequently-used words, the editing speed can be improved to some degree when the user edits the content of a short message or an email.

However, the intelligent learning function of existing input methods is only designed for the input method itself, which is to say, the input method cannot carry out intelligent learning on the basis of the recipient when the user edits the content of a short message or an email; consequently, the user still has to input the content of a short message or an email with an existing input method even when the user wants to send a short message or an email to a recipient who is in frequent contact with him/her. This drawback results in inconvenience when the user wants to rapidly send a short message or an email to a recipient who is in frequent contact with him/her.

SUMMARY OF THE INVENTION

To overcome the drawback in the prior art, the present invention provides a method and a device for rapidly editing the content of a short message or an email based on the recipient, which can automatically prompt frequently-used words related to the recipient when the user edits the content of the short message or email, to enable the user to rapidly finish the input of the content of the short message or email.

To attain the object described above, a method for rapidly editing the content to be sent based on the recipient provided in the present invention comprises the following steps:

1) learning the content to be sent, generating content segments related to the recipient, and carrying out word frequency statistics for the content segments;

2) generating mapping lists of recipient information, content segments, and word frequency statistics, and storing the lists;

3) displaying content segments on the basis of recipient information and word frequency statistics information, for the sender to edit the content to be sent, and sending the completed content to the corresponding recipient.

In step 1), learning the content to be sent is to carry out data mining, Chinese segmentation and statistics on word frequencies.

In step 3), displaying content segments is to display content segments on the basis of the frequencies of use of content segments obtained in the word frequency statistics process for the recipient.

To attain the object described above, the device for rapidly editing the content to be sent based on the recipient provided in the present invention comprises a sent-content editing module, a sent content learning module, an editing-control module/storage module, and an information-sending module, wherein, the sent-content editing module is designed to edit the content to be sent in a short message or an email;

the sent-content learning module is designed to carry out data mining, Chinese segmentation and statistics on word frequencies in the sent content edited by the sent-content editing module;

the editing-control module is designed to control the sent content editing module to edit the content to be sent, control the sent-content learning module to learn, and control the storage module to store;

the storage module is designed to store mapping lists of recipient information, content segments, and word frequency statistics information;

the information-sending module is designed to send the content edited by the user to a recipient via a short message or an email.

Hereunder, other characteristics and advantages of the present invention will be described, and will become apparent partially in the description or will be understood clearly from the description of some embodiments.

BRIEF DESCRIPTION OF THE DRAWINGS

The accompanying drawings are provided to help further understanding of the present invention, and constitute a part of the description. These drawings are used in conjunction with the embodiments to interpret the present invention, but do not constitute any limitation to the present invention. Among the drawings.

DETAILED DESCRIPTION

Hereunder, some preferred embodiments of the present invention will be described, with reference to the accompanying drawings. It should be appreciated that the embodiments described here are only provided to describe and interpret the present invention, but do constitute any limitation to the present invention.

Figure 1:
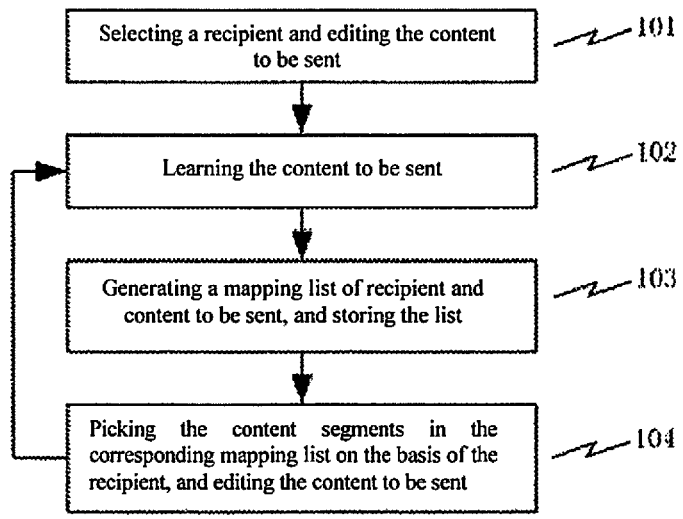
FIG. 1 is a flow chart of the method for rapidly editing the content to be sent based on the recipient according to an embodiment of the present invention.

FIG. 1 is a flow chart of a method for rapidly editing the content to be sent based on the recipient according to the present invention. Hereunder the method for rapidly editing the content to be sent based on the recipient in the present invention will be detailed, with reference to FIG. 1:

To begin with, in step 101, when the sender edits and sends a short message or an email to a recipient for the first time, the sender inputs the recipient information (such as a mobile phone number or email address), edits the content to be sent, and sends the short message or email;

In step 102, the sent-content- learning module 201 learns the content to be sent, generates content segments related to the recipient, and carries out word frequency statistics for the content segments. In the present invention, the learning of the content to be sent includes data mining, Chinese segmentation and statistics on word frequencies, etc.; the content segments may include title, time, and event information on the short message or email;

In step 103, mapping lists of recipient information, content segments, and word frequency statistics information are generated and stored in the storage module 204;

In step 104, when the content to be sent is edited for a recipient, content segments are prompted in a content segment display box on the basis of the frequencies of use of content segments obtained in the word frequency statistics process for the recipient; then, the expected content segments are selected, the content to be sent is edited, and the short message or email is sent.

Figure 2:
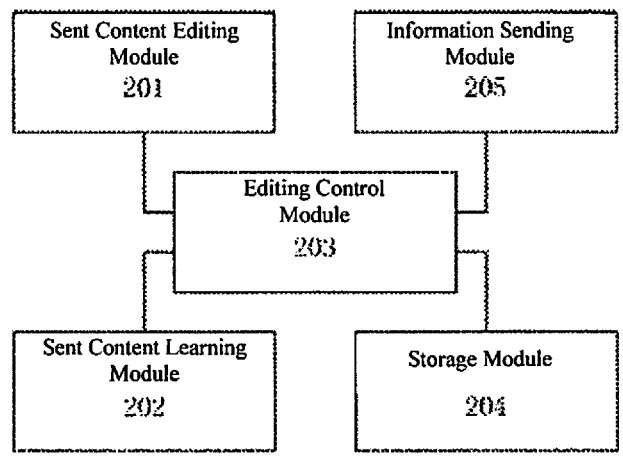
FIG. 2 is a functional block diagram of the device for rapidly editing the content to be sent based on the recipient according to an embodiment of the present invention.

FIG. 2 is a functional block diagram of the device for rapidly editing the content to be sent based on the recipient provided in the present invention. As shown in FIG. 2, the device for rapidly editing the content to be sent based on the recipient provided in the present invention comprises a sent-content-editing module 201, a sent-content-learning module 202, an editing-control module 203, a storage module 204, and an information-sending module 205, wherein, the sent-content-editing module 201 is designed to edit the content to be sent in a short message or an email, under the control of the editing-control module 203;

the sent-content-learning module 202 is designed to collect content segments in the sent-content-edited by the sent-content-editing module 201 and carry out data mining, Chinese segmentation and statistics on word frequencies etc. for the content segments, under the control of the editing control module 203;

the editing-control module 203 is designed to control the sent-content-editing module 201, sent-content-learning module 202, storage module 204, and information-sending module 205 to work;

the storage module 204 is designed to store mapping lists of recipient and content segments, under the control of the editing-control module 203;

the information-sending module 205 is designed to send the content edited by the user to a recipient via a short message or an email, under the control of the editing-control module 203.

Figure 3:
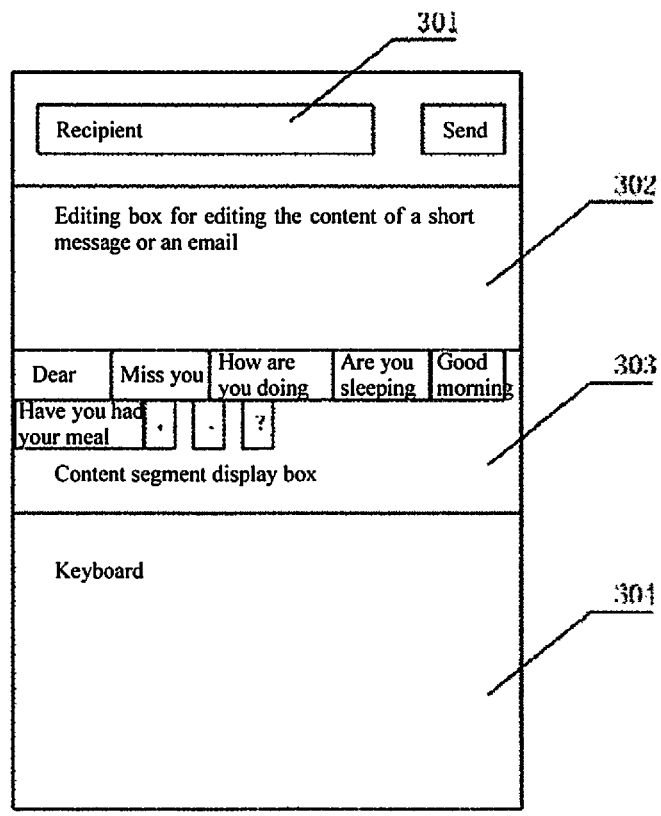
FIG. 3 is a schematic diagram of rapidly editing of the content to be sent according to an embodiment of the present invention.

FIG. 3 is a schematic diagram of rapidly editing of the content to be sent according to the present invention. As shown in FIG. 3, when the user uses a keyboard 304 to edit the content of a short message or an email, frequently-used content segments related to the recipient will be prompted in a content segment display box 303 once the recipient information is inputted in the recipient field 301; thus, the sender only has to select expected content segments from the content segment display box 303, and thereby rapidly finishes the editing of the content to be sent in a short-message content-editing box 302. The present invention will log the target receiver (recipient information) and the content to be sent (including time and geographical location), and learn the content to be sent by means of (but not limited to) data mining, Chinese segmentation and statistics of word frequencies, etc., and thereby generate content segments including the title, time, and event information in the short message sent by the sender to a specific recipient.

EXAMPLE 1

A man often sends a short message to his wife when he is off duty on working days. Usually the content of such a short message is essentially as follows:

"My dear wife, what vegetables should I bring back this evening?"

Through learning, the present invention generates the following content segments: "wife", "this evening", "what", "vegetables", ",",".", and "?".

Next time, when the man wants to send a short message to his wife at about the same time, he can directly pick from the above content segments prompted by the present invention to prepare the content of the short message, instead of inputting the entire content to be sent.

EXAMPLE 2

For the short messages between a pair of young lovers, through learning, the present invention may generate content segments as follows: "dear", "miss you", "how are you doing", "are you sleeping", "good morning", "have you had your meal", "," and "?".

Next time, when a short message or an email is to be sent, the user can directly pick from the content segments and prepare the content.

The content learned by the present invention may include, but is not limited to: recipient information, content of a short message, time, and geographical location of the user, etc. The present invention can prompt the best content segments and phrases on the basis of recipient, current time, and current geographical location, etc.

The present invention can be used in a mobile terminal to enable the user to input rapidly, and thereby can improve the user's experience.

Those skilled in the art should appreciate: the embodiments described above are only some preferred embodiments of the present invention, and should not be deemed as constituting any limitation to the present invention. Though the present invention is described and illustrated in detail with reference to the embodiments, the present invention is not limited to these embodiments. Those skilled in the art can easily make modifications to the technical solution described above in the embodiments or make equivalent replacement of some technical features. However, any modification, equivalent replacement, or refinement to the embodiments without departing from the spirit and principle of the present invention shall be deemed as falling into the protected scope of the present invention.

The invention claimed is:

1. A method for rapidly editing content to be sent based on a recipient, the method comprising:
   learning the content to be sent, and generating, from the content to be sent, content segments for a recipient, the content segments generated including corresponding word frequency statistics for each of the content segments;
   generating mapping lists of recipient information, content segments, and word frequency statistics, and storing the lists;
   determining the recipient for a completed content to be sent;
   displaying the content segments on a basis of the recipient and the word frequency statistics, the content segments displayed for a sender to generate the completed content to be sent; and
   sending the completed content to the recipient.

2. The method for rapidly editing the content to be sent based on a recipient according to claim 1, wherein learning the content to be sent includes carrying out data mining, Chinese segmentation and statistics on word frequencies for the content to be sent.

3. The method for rapidly editing the content to be sent based on a recipient according to claim 1, wherein displaying content segments includes displaying content segments on a basis of frequencies of use of content segments obtained in the word frequency statistics process for the recipient.

4. A device for rapidly editing the content to be sent based on a recipient, the device comprising a sent content editing module, a sent content learning module, an editing control module/storage module, and an information sending module, wherein:

the sent-content-editing module is designed to generate the content to be sent in a short message or an email;

the sent-content-learning module is designed to generate, from the content to be sent, content segments for the recipient, the content segments generated including corresponding word frequency statistics for each of the content segments, the word frequency statistics generated via one or more of data mining, Chinese segmentation and statistics on word frequencies in the sent-content generated by the sent-content-editing module;

the editing-control module is designed to control the sent-content-editing module to generate the content to be sent by displaying, for a user, the content segments based on the recipient and the word frequency statistics, the editing-control module further designed to control the sent-content-learning module to learn, and control the storage module to store;

the storage module is designed to store mapping lists of recipient information, content segments, and word frequency statistics information; and the information-sending module is designed to send the content generated by the user to a recipient via a short message or an email.

5. A mobile terminal for rapidly editing the content to be sent, wherein, the mobile terminal comprises the device of claim 4.

* * * * *